US012583453B2

(12) United States Patent
Joseph et al.

(10) Patent No.: US 12,583,453 B2
(45) Date of Patent: Mar. 24, 2026

(54) VEHICULAR TRAILERING ASSIST SYSTEM WITH DRIVER MONITORING AND GESTURE DETECTION

(71) Applicant: Magna Electronics Inc., Auburn Hills, MI (US)

(72) Inventors: Harold E. Joseph, Brampton (CA); Jyothi P. Gali, Rochester Hills, MI (US)

(73) Assignee: Magna Electronics Inc., Auburn Hills, MI (US)

(*) Notice: Subject to any disclaimer, the term of this patent is extended or adjusted under 35 U.S.C. 154(b) by 217 days.

(21) Appl. No.: 18/315,615

(22) Filed: May 11, 2023

(65) Prior Publication Data

US 2023/0365134 A1 Nov. 16, 2023

Related U.S. Application Data

(60) Provisional application No. 63/364,740, filed on May 16, 2022.

(51) Int. Cl.
*B60W 30/18* (2012.01)
*B60W 10/18* (2012.01)
*B60W 10/20* (2006.01)

(52) U.S. Cl.
CPC ...... *B60W 30/18036* (2013.01); *B60W 10/18* (2013.01); *B60W 10/20* (2013.01); *B60W 2300/14* (2013.01); *B60W 2420/403* (2013.01); *B60W 2540/223* (2020.02); *B60W 2540/225* (2020.02)

(58) Field of Classification Search
CPC ........... B60W 30/18036; B60W 10/18; B60W 10/20; B60W 2300/14; B60W 2420/403; B60W 2540/223; B60W 2540/225; B60W 2530/203; B60W 2710/207
USPC .......................................................... 701/41
See application file for complete search history.

(56) References Cited

U.S. PATENT DOCUMENTS

| | | | |
|---|---|---|---|
| 9,077,962 B2 | 7/2015 | Shi et al. | |
| 9,085,261 B2 | 7/2015 | Lu et al. | |
| 9,090,234 B2 | 7/2015 | Johnson et al. | |
| 9,092,986 B2 | 7/2015 | Salomonsson et al. | |
| 9,126,525 B2 | 9/2015 | Lynam et al. | |
| 9,140,789 B2 | 9/2015 | Lynam | |
| 9,146,898 B2 | 9/2015 | Ihlenburg et al. | |
| 9,174,574 B2 | 11/2015 | Salomonsson | |
| 9,205,776 B2 | 12/2015 | Turk | |
| 9,233,641 B2 | 1/2016 | Sesti et al. | |
| 9,405,120 B2 | 8/2016 | Graf et al. | |
| 9,446,713 B2 | 9/2016 | Lu et al. | |
| 9,558,409 B2 | 1/2017 | Pliefke et al. | |

(Continued)

*Primary Examiner* — Yi-Kai Wang
(74) *Attorney, Agent, or Firm* — HONIGMAN LLP

(57) ABSTRACT

A vehicular trailering assist system includes a rearward viewing camera disposed at a rear portion of a vehicle. A driver monitoring camera views at least a head region of a driver of the vehicle. During a reversing maneuver of the vehicle with a trailer hitched at a hitch of the vehicle and based at least in part on processing of image data captured by the rearward viewing camera, the system controls steering of the vehicle. During the reversing maneuver and based at least in part on monitoring of the driver based on processing of image data captured by the driver monitoring camera, the system adjusts control of steering of the vehicle.

20 Claims, 4 Drawing Sheets

(56)     References Cited

U.S. PATENT DOCUMENTS

| | | |
|---|---|---|
| 9,900,490 B2 | 2/2018 | Ihlenburg et al. |
| 10,017,114 B2 | 7/2018 | Bongwald |
| 10,065,574 B2 | 9/2018 | Tiryaki |
| 10,071,687 B2 | 9/2018 | Ihlenburg et al. |
| 10,086,870 B2 | 10/2018 | Gieseke et al. |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 10,958,830 B2 | 3/2021 | Koravadi |
| 11,518,401 B2 | 12/2022 | Kulkarni |
| 11,639,134 B1 | 5/2023 | Huizen et al. |
| 11,780,372 B2 | 10/2023 | Sobecki et al. |
| 11,827,153 B2 | 11/2023 | Miller et al. |
| 12,093,455 B2 | 9/2024 | Gieseke et al. |
| 12,115,918 B2 | 10/2024 | Peterson |
| 2014/0293057 A1 | 10/2014 | Wierich |
| 2014/0307095 A1 | 10/2014 | Wierich |
| 2014/0309884 A1 | 10/2014 | Wolf |
| 2014/0313339 A1 | 10/2014 | Diessner |
| 2014/0320636 A1 | 10/2014 | Bally et al. |
| 2014/0320658 A1 | 10/2014 | Pliefke |
| 2014/0327772 A1 | 11/2014 | Sahba |
| 2014/0327774 A1 | 11/2014 | Lu et al. |
| 2014/0336876 A1 | 11/2014 | Gieseke et al. |
| 2014/0340510 A1 | 11/2014 | Ihlenburg et al. |
| 2014/0347486 A1 | 11/2014 | Okouneva |
| 2015/0002670 A1 | 1/2015 | Bajpai |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0217693 A1* | 8/2015 | Pliefke ................... H04N 7/183 |
| | | 348/118 |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0217372 A1 | 8/2017 | Lu et al. |
| 2017/0254873 A1 | 9/2017 | Koravadi |
| 2017/0274906 A1 | 9/2017 | Hassan et al. |
| 2018/0134217 A1 | 5/2018 | Peterson et al. |
| 2018/0215382 A1 | 8/2018 | Gupta et al. |
| 2018/0222414 A1 | 8/2018 | Ihlenburg et al. |
| 2018/0231976 A1 | 8/2018 | Singh |
| 2018/0276838 A1 | 9/2018 | Gupta et al. |
| 2019/0039649 A1 | 2/2019 | Gieseke et al. |
| 2019/0064831 A1 | 2/2019 | Gali et al. |
| 2019/0118860 A1 | 4/2019 | Gali et al. |
| 2019/0210615 A1 | 7/2019 | Caron et al. |
| 2019/0347825 A1 | 11/2019 | Gupta et al. |
| 2020/0017143 A1 | 1/2020 | Gali |
| 2020/0143560 A1 | 5/2020 | Lu et al. |
| 2020/0202151 A1 | 6/2020 | Wacquant |
| 2020/0320320 A1 | 10/2020 | Lynam |
| 2020/0334475 A1 | 10/2020 | Joseph et al. |
| 2020/0356788 A1 | 11/2020 | Joseph et al. |
| 2020/0361397 A1* | 11/2020 | Joseph ..................... B60D 1/28 |
| 2020/0406967 A1 | 12/2020 | Yunus et al. |
| 2021/0078634 A1 | 3/2021 | Jalalmaab et al. |
| 2021/0127693 A1 | 5/2021 | Tomita et al. |
| 2021/0155167 A1 | 5/2021 | Lynam et al. |
| 2021/0162926 A1 | 6/2021 | Lu |
| 2021/0170820 A1 | 6/2021 | Zhang |
| 2021/0170947 A1 | 6/2021 | Yunus et al. |
| 2021/0245662 A1 | 8/2021 | Blank et al. |
| 2021/0291739 A1 | 9/2021 | Kasarla et al. |
| 2021/0323473 A1 | 10/2021 | Peterson et al. |
| 2022/0024391 A1 | 1/2022 | Gali et al. |
| 2022/0027644 A1 | 1/2022 | Gali et al. |
| 2022/0028111 A1 | 1/2022 | Gali et al. |
| 2022/0111857 A1 | 4/2022 | Kulkarni |
| 2022/0189052 A1 | 6/2022 | Jalalmaab et al. |
| 2022/0212599 A1 | 7/2022 | Gali et al. |
| 2022/0215670 A1 | 7/2022 | Gali et al. |
| 2022/0242350 A1* | 8/2022 | Odai ...................... B60K 35/25 |
| 2022/0242430 A1* | 8/2022 | Watano ................... G10L 15/25 |
| 2022/0242438 A1 | 8/2022 | Sobecki et al. |
| 2022/0254132 A1 | 8/2022 | Rother |
| 2022/0377219 A1 | 11/2022 | Conger et al. |
| 2024/0064274 A1 | 2/2024 | Blank et al. |
| 2024/0227516 A1 | 7/2024 | Moschek et al. |
| 2024/0326726 A1 | 10/2024 | Higgins-Luthman et al. |
| 2025/0004549 A1 | 1/2025 | Kasarla et al. |

* cited by examiner

VEHICULAR TRAILERING ASSIST SYSTEM WITH DRIVER MONITORING AND GESTURE DETECTION

CROSS REFERENCE TO RELATED APPLICATION

The present application claims the filing benefits of U.S. provisional application Ser. No. 63/364,740, filed May 16, 2022, which is hereby incorporated herein by reference in its entirety.

FIELD OF THE INVENTION

The present invention relates generally to a vehicle and trailer guidance system for guiding a vehicle and trailer during a reversing maneuver.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A vehicle with a trailer hitched thereto is equipped with a trailer assist system. The trailer assist system includes a rearward viewing camera disposed at a rear portion of the vehicle. The rearward viewing camera views at least rearward of the vehicle and, with a trailer hitched to a hitch of the vehicle, the rearward viewing camera views a portion of the trailer hitched at the hitch of the vehicle. The rearward viewing camera may include a CMOS imaging array having at least one million photosensors arranged in rows and columns. During a reversing maneuver of the vehicle with the trailer hitched at the hitch of the vehicle, the rearward viewing camera captures image data. A driver monitoring camera is disposed at an interior portion of the vehicle and views at least a head region of a driver of the vehicle. The driver monitoring camera captures image data. An electronic control unit (ECU) includes electronic circuitry and associated software and the electronic circuitry of the ECU includes an image processor for processing image data captured by the rearward viewing camera and the driver monitoring camera. During the reversing maneuver of the vehicle with the trailer hitched at the hitch of the vehicle and based on processing of image data captured by the rearward viewing camera, the system controls steering of the vehicle to maneuver the trailer along a path of travel of the trailer as the vehicle reverses the trailer toward a target destination. Based on processing of image data captured by the driver monitoring camera, the system determines a behavior or movement or gesture or gaze direction of the driver. During the reversing maneuver of the vehicle with the trailer hitched at the hitch of the vehicle and based on the determined behavior or movement or gesture or gaze direction of the driver, the system adjusts control of the steering of the vehicle to adjust the path of travel of the trailer and the vehicle as the vehicle reverses the trailer toward the target destination.

These and other objects, advantages, purposes and features of the present invention will become apparent upon review of the following specification in conjunction with the drawings.

DESCRIPTION OF THE PREFERRED EMBODIMENTS

A vehicle and trailer maneuvering or assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
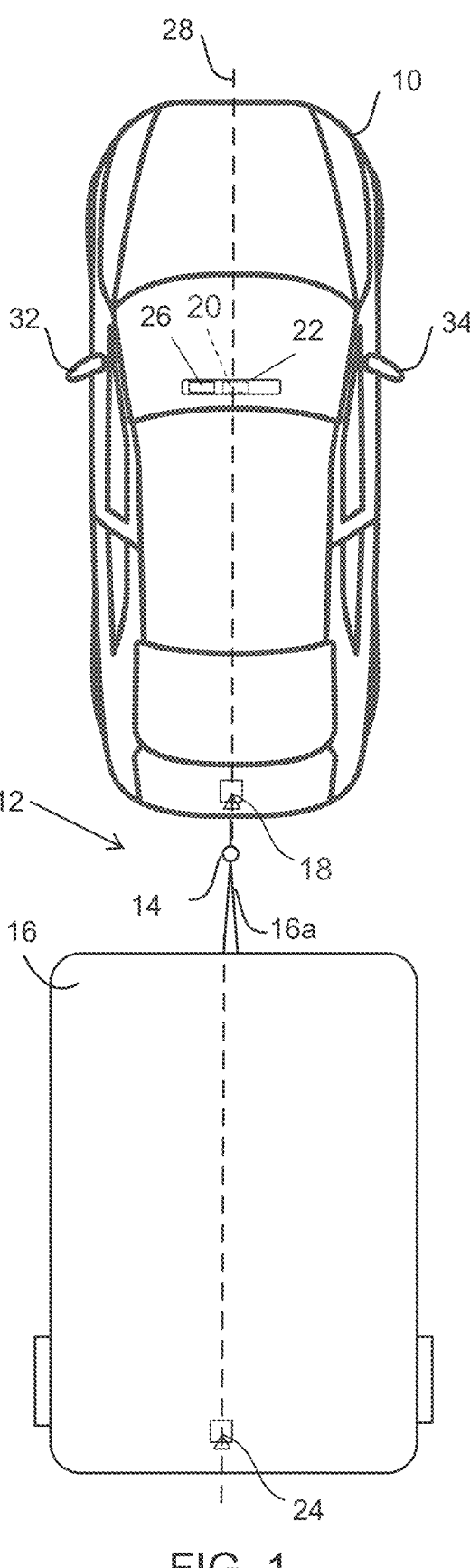
FIG. 1 is a plan view of a vehicle with a vehicular trailer assist system and having a trailer hitched at a hitch of the vehicle.

Referring now to the drawings and the illustrative embodiments depicted therein, a vehicle 10 includes a trailer maneuvering or guidance or trailer assist system 12 that is operable to guide the driver or steering of the vehicle during backing up or reversing of the vehicle with a hitched trailer 16 (FIG. 1). The trailer 16 is hitched at the vehicle 10 via, for example, a hitch 14 (such as via a trailer coupler at the end of a trailer tongue 16a hitching to the hitch ball of the hitch of the vehicle to establish a pivoting joint connection of the trailer 16 to the vehicle 10). The trailer guidance system 12 may guide and maneuver the vehicle 10 and the trailer 16 toward a desired or selected location. In the illustrated embodiment, the trailer hitching assist system 12 includes at least one exterior viewing vehicle-based imaging sensor or camera, such as a rearward-viewing imaging sensor or camera 18 (and the system may optionally include multiple exterior viewing imaging sensors or cameras, such as a sideward/rearward-viewing camera at respective sides of the vehicle and/or a rear backup camera at a rear portion of the vehicle), which captures image data representative of the scene exterior of the vehicle 10 (FIG. 1). The field of view of the rearward-viewing camera 18 may include at least a portion of the hitch 14 and/or trailer 16. The rearward-viewing camera 18 includes a lens for focusing images at or onto an imaging array or imaging plane or imager of the camera. Optionally, the camera may be a center-high-mounted stop lamp (CHMSL) camera. Optionally, the system 12 may receive image data from one or more trailer-based cameras 24 disposed at the trailer 16 and that capture image data representative of respective fields of view surrounding the trailer. For example, the system may utilize characteristics of the systems described in U.S. patent application Ser. No. 18/161,189, filed. Jan. 30, 2023, which is hereby incorporated herein by reference in its entirety. The trailer assist system 12 includes a control or electronic control unit (ECU) 20 or processor that is operable to process image data captured by the camera or cameras and may detect objects or the like and/or provide displayed images at a display device for viewing by the driver of the vehicle (the control 20 and/or display device may be part of or incorporated in or at an interior rearview mirror assembly 22 of the vehicle, or the control and/or the display device may be disposed elsewhere at or in the vehicle). The lens may comprise a wide angle or fisheye lens and the camera may capture fisheye-view frames of image data for processing at the ECU. The data transfer or signal communication from the camera(s) to the ECU may comprise any suitable data or communication link, such as a vehicle network bus or the like of the equipped vehicle.

Reversing the vehicle with a trailer hitched to the vehicle may be a difficult task for a driver of the vehicle. Typically, a driver may provide input to a steering system of the vehicle (such as via a steering wheel, knob, slider, or pair of keys connected to the steering system) to control the steering of the vehicle and to control respective paths of travel of the trailer and vehicle, such as by maneuvering the vehicle to control a trailer angle of the trailer relative to a longitudinal axis 28 of the vehicle. In other words, as the vehicle reverses the trailer toward a target destination, the path of travel of the vehicle may control the path of travel of the trailer hitched to the vehicle. Traditionally, trailer assist systems may aid the driver in controlling the steering of the vehicle as the vehicle reverses with the trailer hitched to the vehicle, but these trailer assist systems may require the driver to turn their head or avert their gaze (such as to view through the rear window of the vehicle or to view an interior rearview mirror or exterior rearview mirror) to check and correct the position of the trailer.

That is, a trailer is a rigid body that may comprise different sizes and shapes connected to a vehicle on a hitch ball. When the vehicle turns when reversing, the trailer connected to the vehicle may move in the opposite direction. Trailer backup guidance may help reverse the trailer and vehicle more easily, but still the user must use a knob or a slider or a pair of keys or the steering wheel to adjust the steering of the vehicle. In spite of the above techniques, the user has to look out through the side mirror to check the correct position of the trailer.

In the illustrated example of FIGS. 1-4, the system 12 includes or is in communication with a driver monitoring system and driver monitoring camera 26 disposed at an interior portion of the vehicle 10. For example, the driver monitoring camera 26 may be disposed at the interior rearview mirror assembly 22 and view at least a head region of the driver of the vehicle 10. The driver monitoring camera captures image data representative of the driver to, for example, determine attentiveness, drowsiness, a gaze direction, and/or a gesture of the driver. The driver monitoring system and camera may utilize characteristics of the driver monitoring systems and cameras described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, which are hereby incorporated herein by reference in their entireties. The trailer assist system 12, while controlling the steering of the vehicle 10 to maneuver the vehicle and trailer as the vehicle reverses with the trailer 16 hitched to the vehicle 10, determines a behavior or movement or gesture or gaze direction of the driver, based on images captured by the driver monitoring camera 26, and adjusts control of the steering of the vehicle based on the determined gesture.

Figure 2:
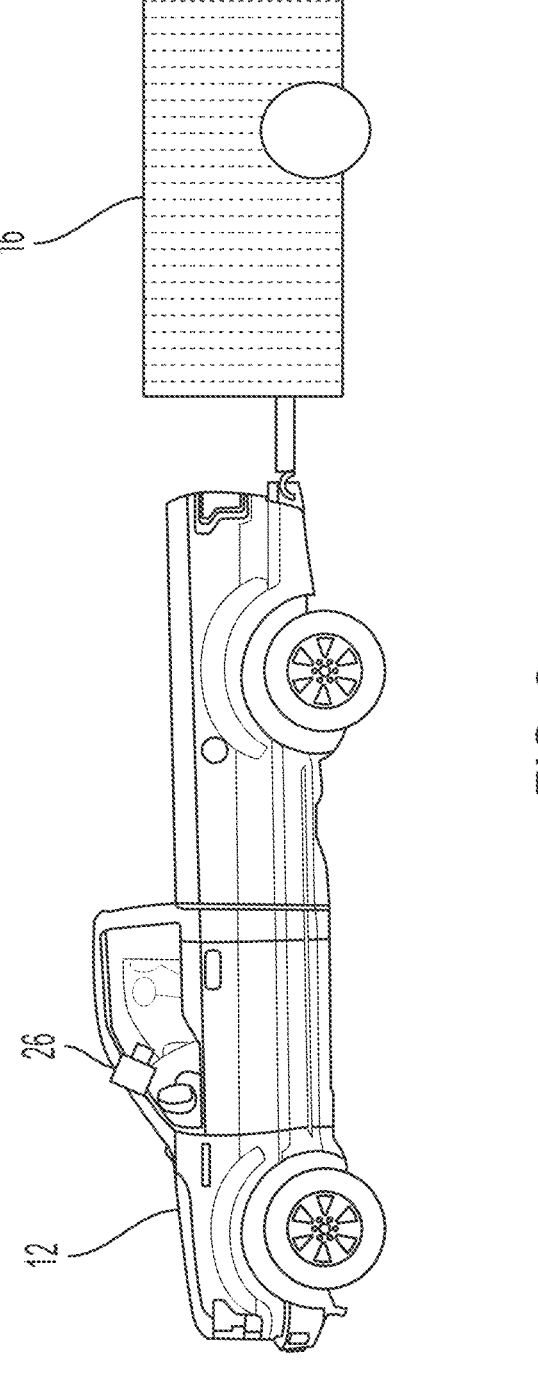
FIG. 2 is a perspective view of the vehicle with the vehicular trailer assist system and including a driver monitoring camera.
Figure 3:
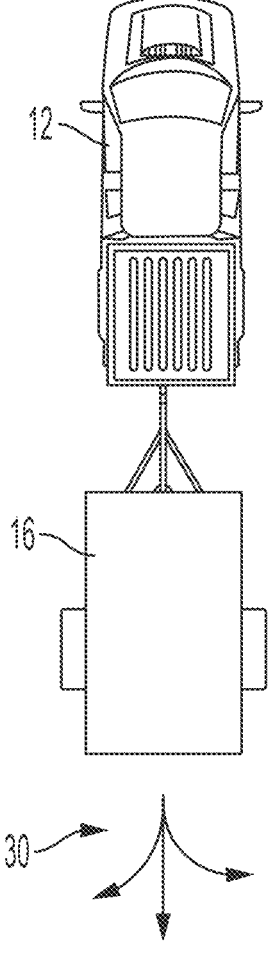
FIG. 3 is another plan view of the vehicle and trailer, showing paths of travel of the trailer and vehicle as the vehicle reverses the trailer.
Figure 4:
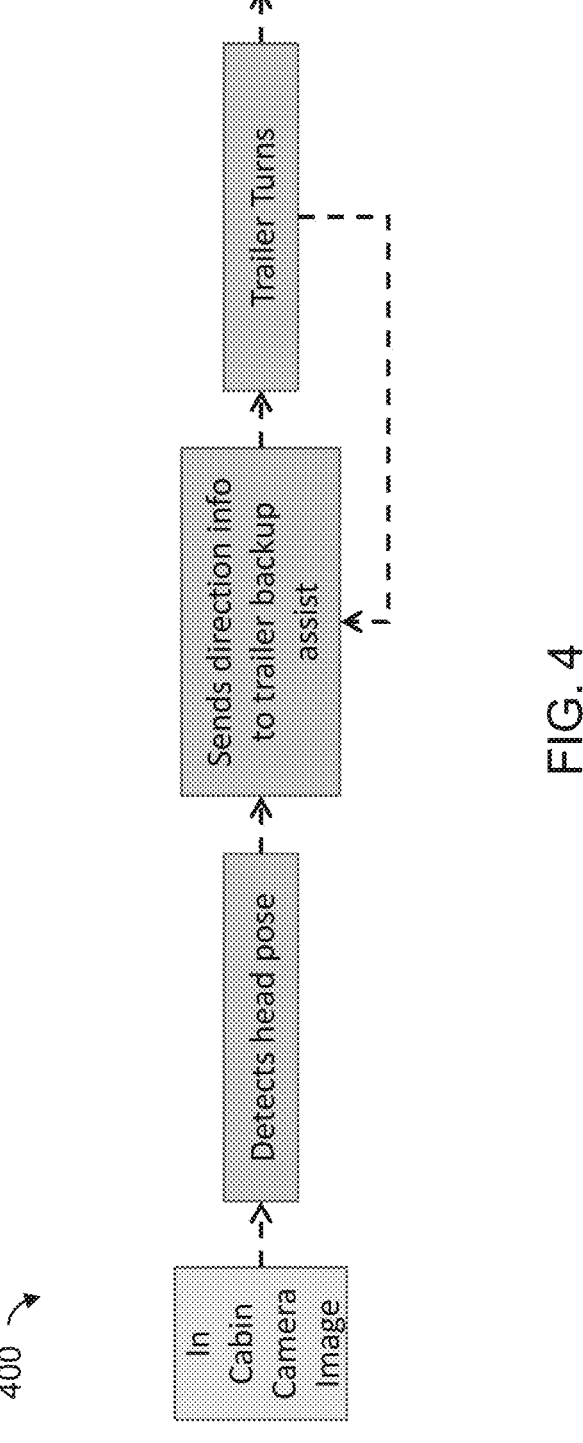
FIG. 4 is a flow diagram of an example method of adjusting steering of the vehicle to adjust the path of travel of the trailer and vehicle based on a determined gesture of the driver of the vehicle.

As shown in FIGS. 2-4, the driver monitoring camera 26 captures image data representative of the driver and, based on processing of the captured image data at the image processor of the ECU, the system 12 determines a gesture of the driver. For example, the system may determine a gaze direction of the driver (i.e., a principal axis of the line of sight of the driver) or a head pose of the driver (i.e., a direction toward which the driver's head is turned or angled). The system 12 may determine that the driver is looking or directing their head in a particular direction (e.g., toward the passenger side of the vehicle or toward the driver side of the vehicle) or the system may determine that the driver is performing a certain action, such as making a hand motion.

Based on the determined behavior or movement or gesture or gaze direction, the system 12 adjusts control of the steering of the vehicle 10 as the vehicle 10 reverses the trailer 16 and vehicle to adjust the paths of travel of the vehicle and trailer. For example, the system 12 may be controlling the steering of the vehicle 10 to maneuver the vehicle and trailer rearward with the trailer 16 at a given angle relative to the longitudinal axis 28 of the vehicle 10. Based on the behavior or movement or gesture or gaze direction, the system may adjust control of the steering of the vehicle to adjust the trailer angle between the trailer (e.g., the trailer tongue 16a) and the longitudinal axis 28 of the vehicle 10. Optionally, the system 12 may control the steering of the vehicle to cause the vehicle and/or trailer to travel along a determined path of travel 30 and, based on the determined behavior or movement or gesture or gaze direction, the system 12 may adjust the path of travel 30 of the vehicle and/or trailer.

In some examples, the system 12 may determine a gaze direction or a direction of a head pose of the driver, such as to determine that the driver is looking toward or viewing a driver-side exterior rearview mirror 32 or a passenger-side exterior rearview mirror 34 of the vehicle. When viewing one of the exterior rearview mirrors, the driver is able to ensure that the vehicle and trailer avoid collisions with obstacles. Thus, when the driver views the driver-side or passenger-side rearview mirrors (and thus views at least rearward and sideward along the respective side of the vehicle), the system may adjust steering of the vehicle 10 to maneuver the trailer 16 toward the respective side of the vehicle. That is, the system may adjust the trailer angle between the trailer 16 and longitudinal axis 28 of the vehicle 10 toward the viewing direction of the driver or the system may adjust the path of travel 30 of the trailer 16 toward the viewing direction of the driver.

Thus, when the system 12 determines a driver-side gaze direction or a driver-side head pose of the driver (i.e., the driver is looking toward the driver-side exterior rearview mirror 32 or the head of the driver is facing the driver-side exterior rearview mirror), the system may adjust steering of the vehicle to adjust the path of travel 30 of the trailer or the trailer angle toward the driver side of the vehicle. Similarly, when the system 12 determines a passenger-side gaze direction or a passenger-side head pose of the driver (i.e., the driver is looking toward the passenger-side exterior rearview mirror 34 or the head of the driver is facing the passenger-side exterior rearview mirror), the system may adjust steering of the vehicle to adjust the path of travel 30 of the trailer or the trailer angle toward the passenger side of the vehicle.

The system may perform any suitable control or adjustment of the steering of the trailer and vehicle responsive to any determined gesture. For example, when the system 12 determines that the driver is viewing straight back (such as looking through a rear window of the vehicle or viewing an interior rearview mirror assembly), the system may adjust control of the steering of the vehicle to maneuver the vehicle and trailer rearward in a straight line.

Optionally, the system 12 may adjust control of the steering of the vehicle responsive to a verbal command from the driver. For example, the system may capture audio data at the interior portion of the vehicle using a microphone of the vehicle and, based on processing of the audio data, determine that the driver has issued a defined verbal command, such as saying the word "left" to adjust the trailer angle toward the driver side of a left hand drive vehicle or "right" to adjust the trailer angle toward the passenger side of the left hand drive vehicle. The system may monitor movement of the mouth of the driver using the driver monitoring camera to confirm that the audio command was spoken by the driver rather than a passenger of the vehicle. Thus, the system 12 may adjust control of the steering of the vehicle responsive to a determined mouth or lip pose of the driver of the vehicle.

Optionally, the system may adjust steering of the vehicle to adjust the path of travel of the trailer as the vehicle reverses the trailer toward a target location based on a determined hand gesture of the driver. For example, the system may determine one or more hand gestures as instructing the system to adjust the path of travel toward the driver side of the vehicle (such as the driver pointing toward the driver side of the vehicle), the system may determine one or more hand gestures as instructing the system to adjust the path of travel toward the passenger side of the vehicle (such as the driver pointing toward the passenger side of the vehicle), the system may determine one or more hand gestures as instructing the system to straighten the path of travel relative to a centerline axis of the vehicle (such as the driver pointing toward the front or rear of the vehicle), the system may determine one or more hand gestures as instructing the system to control acceleration and/or braking of the vehicle to slow and stop the vehicle (such as the driver holding up a flat hand or first) or otherwise adjust the speed of the vehicle and trailer along the paths of travel (such as the driver pointing upward to increase the speed and downward to decrease the speed), and the like.

Optionally, the system may adjust steering of the vehicle to adjust the path of travel of the trailer as the vehicle reverses the trailer toward a target location in response to determining more than one behavior or gesture of the driver. For example, when the driver is viewing a passenger side exterior rearview mirror, the system may not adjust steering of the vehicle to adjust the path of travel of the trailer toward the passenger side of the vehicle unless the driver performs a secondary gesture or confirmation gesture to confirm the maneuver, such as through verbal confirmation (e.g., saying "right") or through a hand gesture (e.g., a thumbs up).

Optionally, the system may adjust steering of the vehicle to maneuver the trailer in a direction that is opposite to the determined gesture. For example, if the system determines that the driver is viewing the passenger side exterior rearview mirror, the system may initially adjust steering of the vehicle to maneuver the trailer toward the passenger side of the vehicle until the driver performs a secondary gesture or cancellation gesture to adjust or cancel the maneuver, such as through verbal confirmation (e.g., saying "stop" or "left") or through a hand gesture (e.g., a thumbs down). Upon determining the secondary gesture, the system may stop adjusting the path of travel toward the passenger side (e.g., straighten the trailer out relative to the centerline axis of the vehicle) and/or adjust the path of travel toward the driver side.

FIG. 4 depicts an example method 400 of adjusting control of the vehicle 10 during a reversing maneuver with the trailer 16 hitched to the vehicle 10. The vehicle 10 receives and processes image data from the driver monitoring camera 26 and determines a gesture, such as a head pose, of the driver. Based on the determined gesture, the system 12 communicates a signal to a steering system of the vehicle to adjust steering of the vehicle as the vehicle and trailer perform the reversing maneuver. This causes the trailer to turn based on a direction or type of the gesture.

Thus, the system uses an in-cabin camera to detect the head pose of the driver. Based on the determined head pose, the system causes the trailer to then turn in the direction in which the head is turned. The system is able to read the head pose when the user is viewing the side mirrors. The system may cause the trailer to turn one direction as long as the head is turned in that direction. In case the user is not looking at any side mirrors, the system may cause the trailer to reverse straight backup. The system may be used for providing trailer reverse assistance and/or guidance and for follow trailer features. The system may determine gestures such as driver head pose, hand, lip, or other object based gestures.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2022-0215670; US-2022-0212599; US-2022-0189052; US-2022-0028111; US-2022-0027644; US-2022-0024391; US-2021-0170947; US-2021-0170820; US-2021-0078634; US-2020-0406967; US-2020-0361397; US-2020-0356788; US-2020-0334475; US-2020-0017143; US-2019-0118860; US-2019-0064831; US-2019-0039649; US-2019-0347825; US-2018-0276838; US-2018-0215382; US-2017-0254873; US-2017-0217372 and/or US-2015-0002670, and/or International Publication No. WO 2021/0127693, which are all hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,065,574; 10,017,114; 9,405,120 and/or 7,914,187, and/or U.S. Publication Nos. US-2022-0377219; US-2022-0254132; US-2022-0242438; US-2022-0111857; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:

a rearward viewing camera disposed at a rear portion of a vehicle equipped with the vehicular trailering assist system and viewing at least rearward of the vehicle, wherein, with a trailer hitched at a hitch of the vehicle, the rearward viewing camera views at least a portion of the trailer hitched at the hitch of the vehicle, and wherein the rearward viewing camera is operable to capture image data;

wherein the rearward viewing camera comprises a CMOS imaging array having at least one million photosensors arranged in rows and columns;

a driver monitoring camera disposed at an interior portion of the vehicle and viewing at least a head region of a driver of the vehicle, wherein the driver monitoring camera is operable to capture image data;

an electronic control unit (ECU) comprising electronic circuitry and associated software;

wherein the electronic circuitry of the ECU comprises an image processor for processing image data captured by the rearward viewing camera and for processing image data captured by the driver monitoring camera;

wherein, during a reversing maneuver of the vehicle with the trailer hitched at the hitch of the vehicle and based at least in part on processing of image data captured by the rearward viewing camera, the vehicular trailering assist system controls steering of the vehicle;

wherein, based on processing of image data captured by the driver monitoring camera, the vehicular trailering assist system monitors the driver;

wherein, during the reversing maneuver of the vehicle with the trailer hitched at the hitch of the vehicle and based at least in part on monitoring of the driver, the vehicular trailering assist system adjusts control of steering of the vehicle; and wherein, during the reversing maneuver of the vehicle with the trailer hitched at the hitch of the vehicle, and based on processing of image data captured by the driver monitoring camera, and responsive to determining a gesture performed by the driver of the vehicle, the vehicular trailering assist system adjusts control of steering of the vehicle to maneuver the trailer toward a direction corresponding to the determined gesture;

wherein the determined gesture comprises a determined gaze direction of the driver; and wherein, based on determination of a driver-side gaze direction of the driver toward a driver side of the vehicle, the vehicular trailering assist system adjusts control of steering of the vehicle to maneuver the trailer toward the driver side of the vehicle.

2. The vehicular trailering assist system of claim 1, wherein the vehicular trailering assist system determines the driver-side gaze direction when the gaze direction of the driver is toward a driver-side exterior rearview mirror of the vehicle.

3. The vehicular trailering assist system of claim 1, wherein, based on determination of a passenger-side gaze direction of the driver toward a passenger side of the vehicle, the vehicular trailering assist system adjusts control of steering of the vehicle to maneuver the trailer toward the passenger side of the vehicle.

4. The vehicular trailering assist system of claim 3, wherein the vehicular trailering assist system determines the passenger-side gaze direction when the gaze direction of the driver is toward a passenger-side exterior rearview mirror of the vehicle.

5. A vehicular trailering assist system, the vehicular trailering assist system comprising:

a rearward viewing camera disposed at a rear portion of a vehicle equipped with the vehicular trailering assist system and viewing at least rearward of the vehicle, wherein, with a trailer hitched at a hitch of the vehicle, the rearward viewing camera views at least a portion of the trailer hitched at the hitch of the vehicle, and wherein the rearward viewing camera is operable to capture image data;

wherein the rearward viewing camera comprises a CMOS imaging array having at least one million photosensors arranged in rows and columns;

a driver monitoring camera disposed at an interior portion of the vehicle and viewing at least a head region of a driver of the vehicle, wherein the driver monitoring camera is operable to capture image data;

an electronic control unit (ECU) comprising electronic circuitry and associated software;

wherein the electronic circuitry of the ECU comprises an image processor for processing image data captured by the rearward viewing camera and for processing image data captured by the driver monitoring camera;

wherein, during a reversing maneuver of the vehicle with the trailer hitched at the hitch of the vehicle and based at least in part on processing of image data captured by the rearward viewing camera, the vehicular trailering assist system controls steering of the vehicle;

wherein, based on processing of image data captured by the driver monitoring camera, the vehicular trailering assist system monitors the driver;

wherein, during the reversing maneuver of the vehicle with the trailer hitched at the hitch of the vehicle and based at least in part on monitoring of the driver, the vehicular trailering assist system adjusts control of steering of the vehicle;

wherein, during the reversing maneuver of the vehicle with the trailer hitched at the hitch of the vehicle, and based on processing of image data captured by the driver monitoring camera, and responsive to determining a gesture performed by the driver of the vehicle, the vehicular trailering assist system adjusts control of steering of the vehicle to maneuver the trailer toward a direction corresponding to the determined gesture;

wherein the determined gesture comprises a determined mouth movement of the driver;

wherein, based on determination of a mouth movement of the driver corresponding to a driver side of the vehicle, the vehicular trailering assist system adjusts control of steering of the vehicle to maneuver the trailer toward the driver side of the vehicle; and wherein, based on determination of a mouth movement of the driver corresponding to a passenger side of the vehicle, the vehicular trailering assist system adjusts control of steering of the vehicle to maneuver the trailer toward the passenger side of the vehicle.

6. The vehicular trailering assist system of claim 1, wherein, during the reversing maneuver of the vehicle with the trailer hitched at the hitch of the vehicle and based on monitoring of the driver, the vehicular trailering assist system stops adjusting control of steering of the vehicle to maintain a path of travel of the trailer.

7. The vehicular trailering assist system of claim 1, wherein the driver monitoring camera is accommodated by a mirror head of a vehicular interior rearview mirror assembly, and wherein the driver monitoring camera is movable together and in tandem with the mirror head when the mirror head is adjusted when the driver of the vehicle sets a preferred rearward view provided by a mirror reflective element accommodated by the mirror head.

8. The vehicular trailering assist system of claim 7, wherein the driver monitoring camera is accommodated by the mirror head behind the mirror reflective element and views through the mirror reflective element.

9. A vehicular trailering assist system, the vehicular trailering assist system comprising:

a rearward viewing camera disposed at a rear portion of a vehicle equipped with the vehicular trailering assist system and viewing at least rearward of the vehicle, wherein, with a trailer hitched at a hitch of the vehicle, the rearward viewing camera views at least a portion of the trailer hitched at the hitch of the vehicle, and wherein the rearward viewing camera is operable to capture image data;

wherein the rearward viewing camera comprises a CMOS imaging array having at least one million photosensors arranged in rows and columns;

a driver monitoring camera disposed at an interior portion of the vehicle and viewing at least a head region of a driver of the vehicle, wherein the driver monitoring camera is operable to capture image data;

an electronic control unit (ECU) comprising electronic circuitry and associated software;

wherein the electronic circuitry of the ECU comprises an image processor for processing image data captured by the rearward viewing camera and for processing image data captured by the driver monitoring camera;

wherein, during a reversing maneuver of the vehicle with the trailer hitched at the hitch of the vehicle and based at least in part on processing of image data captured by the rearward viewing camera, the vehicular trailering assist system controls steering of the vehicle;

wherein, based on processing of image data captured by the driver monitoring camera, the vehicular trailering assist system monitors the driver;

wherein, during the reversing maneuver of the vehicle with the trailer hitched at the hitch of the vehicle and based at least in part on monitoring of the driver, the vehicular trailering assist system adjusts control of steering of the vehicle;

wherein, during the reversing maneuver of the vehicle with the trailer hitched at the hitch of the vehicle, and based on processing of image data captured by the driver monitoring camera, and responsive to determining a gesture performed by the driver of the vehicle, the vehicular trailering assist system adjusts control of steering of the vehicle to maneuver the trailer toward a direction corresponding to the determined gesture;

wherein the determined gesture comprises a determined head pose of the driver;

wherein, based on determination of a driver-side head pose of the driver toward a driver side of the vehicle, the vehicular trailering assist system adjusts control of steering of the vehicle to maneuver the trailer toward the driver side of the vehicle; and wherein, based on determination of a passenger-side head pose of the driver toward a passenger side of the vehicle, the vehicular trailering assist system adjusts control of steering of the vehicle to maneuver the trailer toward the passenger side of the vehicle.

10. The vehicular trailering assist system of claim 9, wherein the vehicular trailering assist system determines the driver-side head pose when a movement of the driver's head is toward a driver-side exterior rearview mirror of the vehicle, and wherein the vehicular trailering assist system determines the passenger-side head pose when movement of the driver's head is toward a passenger-side exterior rearview mirror of the vehicle.

11. The vehicular trailering assist system of claim 9, wherein, during the reversing maneuver of the vehicle with the trailer hitched at the hitch of the vehicle and based on another determined head pose of the driver, the vehicular trailering assist system stops adjusting control of steering of the vehicle to maintain a path of travel of the trailer.

12. The vehicular trailering assist system of claim 9, wherein the driver monitoring camera is accommodated by a mirror head of a vehicular interior rearview mirror assembly, and wherein the driver monitoring camera is movable together and in tandem with the mirror head when the mirror head is adjusted when the driver of the vehicle sets a preferred rearward view provided by a mirror reflective element accommodated by the mirror head.

13. A vehicular trailering assist system, the vehicular trailering assist system comprising:

a rearward viewing camera disposed at a rear portion of a vehicle equipped with the vehicular trailering assist system and viewing at least rearward of the vehicle, wherein, with a trailer hitched at a hitch of the vehicle, the rearward viewing camera views at least a portion of the trailer hitched at the hitch of the vehicle, and wherein the rearward viewing camera is operable to capture image data;

wherein the rearward viewing camera comprises a CMOS imaging array having at least one million photosensors arranged in rows and columns;

a driver monitoring camera disposed at an interior portion of the vehicle and viewing at least a head region of a driver of the vehicle, wherein the driver monitoring camera is operable to capture image data;

an electronic control unit (ECU) comprising electronic circuitry and associated software;

wherein the electronic circuitry of the ECU comprises an image processor for processing image data captured by the rearward viewing camera and for processing image data captured by the driver monitoring camera;

wherein, during a reversing maneuver of the vehicle with the trailer hitched at the hitch of the vehicle and based at least in part on processing of image data captured by the rearward viewing camera, the vehicular trailering assist system controls steering of the vehicle;

wherein, based on processing of image data captured by the driver monitoring camera, the vehicular trailering assist system monitors the driver;

wherein, during the reversing maneuver of the vehicle with the trailer hitched at the hitch of the vehicle and based at least in part on monitoring of the driver, the vehicular trailering assist system adjusts control of steering of the vehicle;

wherein, during the reversing maneuver of the vehicle with the trailer hitched at the hitch of the vehicle, and based on processing of image data captured by the driver monitoring camera, and responsive to determining a gesture performed by the driver of the vehicle, the vehicular trailering assist system adjusts control of steering of the vehicle to maneuver the trailer toward a direction corresponding to the determined gesture;

wherein the determined gesture comprises a determined hand gesture of the driver;

wherein based on determination of a driver-side hand gesture of the driver toward a driver side of the vehicle, the vehicular trailering assist system adjusts control of steering of the vehicle to maneuver the trailer toward the driver side of the vehicle; and wherein, based on determination of a passenger-side hand gesture of the driver toward a passenger side of the vehicle, the vehicular trailering assist system adjusts control of steering of the vehicle to maneuver the trailer toward the passenger side of the vehicle.

14. The vehicular trailering assist system of claim 13, wherein, during the reversing maneuver of the vehicle with the trailer hitched at the hitch of the vehicle and based on determination of another hand gesture of the driver, the vehicular trailering assist system stops adjusting control of steering of the vehicle to maintain a path of travel of the trailer.

15. The vehicular trailering assist system of claim 13, wherein, during the reversing maneuver of the vehicle with the trailer hitched at the hitch of the vehicle and based on determination of a stop hand gesture of the driver, the vehicular trailering assist system controls braking of the vehicle to stop the vehicle.

16. The vehicular trailering assist system of claim 13, wherein the driver monitoring camera is accommodated by a mirror head of a vehicular interior rearview mirror assembly, and wherein the driver monitoring camera is movable together and in tandem with the mirror head when the mirror head is adjusted when the driver of the vehicle sets a preferred rearward view provided by a mirror reflective element accommodated by the mirror head.

17. The vehicular trailering assist system of claim 16, wherein the driver monitoring camera is accommodated by the mirror head behind the mirror reflective element and views through the mirror reflective element.

18. The vehicular trailering assist system of claim 5, wherein, during the reversing maneuver of the vehicle with the trailer hitched at the hitch of the vehicle and based on monitoring of the driver, the vehicular trailering assist system stops adjusting control of steering of the vehicle to maintain a path of travel of the trailer.

19. The vehicular trailering assist system of claim 5, wherein the driver monitoring camera is accommodated by a mirror head of a vehicular interior rearview mirror assembly, and wherein the driver monitoring camera is movable together and in tandem with the mirror head when the mirror head is adjusted when the driver of the vehicle sets a preferred rearward view provided by a mirror reflective element accommodated by the mirror head.

20. The vehicular trailering assist system of claim 19, wherein the driver monitoring camera is accommodated by the mirror head behind the mirror reflective element and views through the mirror reflective element.

* * * * *